(12) United States Patent
Frantz et al.

(10) Patent No.: US 9,062,240 B2
(45) Date of Patent: Jun. 23, 2015

(54) WATER-BASED GROUTING COMPOSITION WITH AN INSULATING MATERIAL

(75) Inventors: Eric B. Frantz, Houston, TX (US); Charles R. Landis, The Woodlands, TX (US)

(73) Assignee: Halliburton Energy Services, Inc., Houston, TX (US)

(*) Notice: Subject to any disclaimer, the term of this patent is extended or adjusted under 35 U.S.C. 154(b) by 544 days.

(21) Appl. No.: 12/814,577

(22) Filed: Jun. 14, 2010

(65) Prior Publication Data

US 2011/0305830 A1   Dec. 15, 2011

(51) Int. Cl.
| | | |
|---|---|---|
| *B05D 7/22* | (2006.01) | |
| *C09K 8/467* | (2006.01) | |
| *C04B 28/00* | (2006.01) | |
| *E21B 36/00* | (2006.01) | |

(52) U.S. Cl.
CPC .............. *C09K 8/467* (2013.01); *C04B 28/001* (2013.01); *E21B 36/003* (2013.01)

(58) Field of Classification Search
CPC ........................................................ B05D 7/22
USPC ................... 427/200–230; 106/705, 706, 900
See application file for complete search history.

(56) References Cited

U.S. PATENT DOCUMENTS

| | | | |
|---|---|---|---|
| 3,230,184 A | | 1/1966 | Alford |
| 3,249,486 A | | 5/1966 | Voisinet |
| 3,642,624 A | | 2/1972 | Howland et al. |
| 3,650,327 A | | 3/1972 | Burnside |
| 3,700,050 A | | 10/1972 | Miles |
| 3,722,591 A | | 3/1973 | Maxson |
| 3,827,978 A | | 8/1974 | Miles |
| 3,831,678 A | | 8/1974 | Mondshine |
| 3,851,704 A | | 12/1974 | Maxson et al. |
| 4,258,791 A | | 3/1981 | Brandt et al. |
| 4,422,805 A | | 12/1983 | Sweatman |
| 4,528,104 A | | 7/1985 | House et al. |
| 4,696,698 A | | 9/1987 | Harriett |
| 4,755,307 A | | 7/1988 | Turner et al. |
| 4,931,195 A | | 6/1990 | Cao et al. |
| 4,948,428 A | * | 8/1990 | Liao .............................. 106/628 |
| 5,013,157 A | | 5/1991 | Mills et al. |
| 5,026,490 A | | 6/1991 | Peiffer et al. |
| 5,093,384 A | | 3/1992 | Hayashi et al. |
| 5,227,349 A | | 7/1993 | Matthews et al. |
| 5,512,096 A | * | 4/1996 | Krause .......................... 106/718 |
| 5,607,901 A | | 3/1997 | Toups, Jr. et al. |
| 5,738,463 A | | 4/1998 | Onan |
| 5,739,212 A | | 4/1998 | Wutz et al. |
| 5,786,045 A | * | 7/1998 | Gerth et al. ..................... 428/15 |
| 5,996,643 A | | 12/1999 | Stonitsch |
| 6,026,861 A | | 2/2000 | Mentzer et al. |
| 6,258,160 B1 | * | 7/2001 | Chatterji et al. ............. 106/705 |
| 6,334,304 B1 | | 1/2002 | Machida et al. |
| 6,335,404 B1 | | 1/2002 | Kirk et al. |
| 6,489,270 B1 | | 12/2002 | Vollmer et al. |
| 7,219,735 B2 | | 5/2007 | Smith et al. |
| 7,275,699 B2 | | 10/2007 | Schmidt |
| 7,374,705 B2 | | 5/2008 | Tierling |
| 7,461,691 B2 | | 12/2008 | Vinegar et al. |
| 7,462,580 B2 | | 12/2008 | Kirsner et al. |
| 7,514,139 B2 | | 4/2009 | Ishida et al. |
| 7,625,845 B2 | | 12/2009 | Wang et al. |
| 2004/0011990 A1 | | 1/2004 | Dunaway et al. |
| 2004/0059054 A1 | | 3/2004 | Lopez et al. |
| 2004/0138070 A1 | * | 7/2004 | Jones et al. ................... 507/112 |
| 2005/0113264 A1 | | 5/2005 | Vollmer |
| 2006/0131536 A1 | | 6/2006 | Qu et al. |
| 2006/0211580 A1 | | 9/2006 | Wang et al. |
| 2007/0259791 A1 | | 11/2007 | Wang et al. |

(Continued)

FOREIGN PATENT DOCUMENTS

| | | |
|---|---|---|
| EP | 0341976 | 11/1989 |
| EP | 0829513 | 3/1998 |

(Continued)

OTHER PUBLICATIONS

Thickening time, Jan. 14, 2006, Schlumberger.*
Gel strength, Dec. 9, 2003, Schlumberger.*
PCT Search Report, Antoinett, Moris; Oct. 6, 2011.
"BP's Unique Completion of High Rate Arctic Wells", Petroleum Engineer, Feb. 1972, pp. 39-41.
"Alaskan Completions Will Be Complicated", World Oil, Jan. 1970, p. 85.
"21. Full-scale tests show effects of hydraulics on lower drilling limit", The Oil and Gas Journal, Apr. 5, 1965, pp. 195-200.

(Continued)

*Primary Examiner* — Dah-Wei D Yuan
*Assistant Examiner* — Hai Yan Zhang
(74) *Attorney, Agent, or Firm* — Holly Soehnge; Baker Botts L.L.P.

(57) ABSTRACT

According to an embodiment, a method for thermally insulating a portion of a tubular located inside an enclosed conduit comprises the steps of: (A) introducing a grouting composition into an annulus between the tubular and the enclosed conduit, the grouting composition comprising: (i) a water-swellable binding material comprising water-swellable clay; (ii) an aqueous liquid, wherein the aqueous liquid is the continuous phase of the grouting composition; and (iii) an insulating material; and (B) allowing the grouting composition to set after the step of introducing, wherein after setting the grouting composition has a thermal conductivity of less than 0.3 BTU/hr·ft·° F. According to another embodiment, a grouting composition for use in insulating a portion of a tubular located inside an enclosed conduit comprises: (A) a water-swellable binding material comprising water-swellable clay; (B) an aqueous liquid, wherein the aqueous liquid is the continuous phase of the grouting composition; and (C) an insulating material, wherein after the grouting composition has set, the grouting composition has a thermal conductivity of less than 0.3 BTU/hr·ft·° F.

19 Claims, No Drawings

(56) References Cited

U.S. PATENT DOCUMENTS

| | | |
|---|---|---|
| 2007/0289733 A1 | 12/2007 | Hinson et al. |
| 2008/0113883 A1* | 5/2008 | Wang et al. ............. 507/219 |
| 2008/0223596 A1 | 9/2008 | Ezell et al. |
| 2008/0224087 A1 | 9/2008 | Ezell et al. |
| 2008/0227665 A1 | 9/2008 | Ezell et al. |
| 2009/0192052 A1 | 7/2009 | Zhang |
| 2010/0025615 A1 | 2/2010 | Lo et al. |

FOREIGN PATENT DOCUMENTS

| | | |
|---|---|---|
| GB | 2247507 | 3/1992 |
| GB | 2443727 | 5/2008 |
| GB | 2443727 A | 5/2008 |
| WO | WO0185829 | 11/2001 |
| WO | WO2007096705 | 8/2007 |
| WO | WO2008064074 | 5/2008 |
| WO | WO2009110798 | 9/2009 |
| WO | WO2009112808 | 9/2009 |
| WO | WO2009134902 | 11/2009 |

OTHER PUBLICATIONS

Vipulanandan, C and Kulkarni, Sujan P. "Shear Bonding and Thermal Properties of Particle-Filled Polymer Grout for Pipe-in-Pipe Application", Journal of Materials in Civil Engineering Jul. 2007, pp. 583-590.

Watkins, Lou, Hershey, Elmer, Cuming Corporation, "Syntactic Foam Thermal Insulation for Ultra-Deepwater Oil and Gas Pipelines", OTC 13134, 2001, pp. 1-6, Offshore Technology Conference, Houston, Texas.

Vipulanadan, C., Kulkani, S., "Thermal and Bonding Shear Strength of Polymer Based and Cementitious Grouts for Pipe-In-Pipe and Geothermal Heat Pump Systems", Pipelines 2005, pp. 371-389, ASCE, USA.

WEBAC Corp., "Polyurethane Water Stop Injection Foam Grout", Jan. 26, 2010, Santa Ana, California.

BASF Corporation, "Polyurethane MDI Handbook", Feb. 2000, pp. 1-31, BASF Corporation, USA.

Prime Resins, "Prime-Flex 985 LX 10, LX20", 2007, pp. 1-4, Conyers, Georgia, USA.

Chin, Yun D., Bomba, John G., Brown, Kvaerner R J, "Structural and Thermal Optimization of Cased Insulated Flowlines", OTC 11042, 1999, pp. 1-9, Offshore Technology Conference, Houston, Texas USA.

Geertsen, Ph.D., Christian, Offredi, P.E., Michael, ITP Interpipe, "Highly Thermally Insulated and Traced Pipelines for Deepwater". pp. 1-13, Louveciennes, France, $12^{th}$ Deep Offshore Technology, Conference, Nov. 7-9, 2000, New Orleans, Louisiana, USA.

Tucker, R.N., Intec Engineering, Inc., Hays, P.R., Texaco, Inc., Antani, J.K., Intec Engineering, Inc., "Insulated Flowline Technology for Deep Water", OTC 8247, 1996, pp. 861-869, Offshore Technology Conference, Houston, Texas USA.

Gustafsson, Silas E., "Transient Hot Strip Techniques for Measuring Thermal Conductivity and Thermal Disffusivity", The Rigaku Journal, 1987, pp. 16-28, vol. 4 No. 1/2, Department of Physics, Chalmers University of Technology, Gothenburg, Sweden.

Nelson, D.O., Halliburton M&S Ltd., Wozniak, Tom, Rockwater Engineering; and Colquhoun, Robin, Gerard Engineering Ltd., "New Thermal Insulations for CDTM Bundles: Foamed Polyurethanes and Silica Sphere Slurries", OTC 7313, 1993, pp. 505-516, Offshore Technology Conference, Houston, Texas USA.

International Search Report for PCT/GB2011/000896 issued Dec. 14, 2012.

* cited by examiner

WATER-BASED GROUTING COMPOSITION WITH AN INSULATING MATERIAL

FIELD OF THE INVENTION

The invention is directed to a water-based grouting composition and a method for thermally insulating a portion of a tubular located inside an enclosed conduit using the grouting composition.

SUMMARY

According to an embodiment, a method for thermally insulating a portion of a tubular located inside an enclosed conduit comprises the steps of: (A) introducing a grouting composition into an annulus between the tubular and the enclosed conduit, the grouting composition comprising: (i) a water-swellable binding material comprising a water-swellable clay; (ii) an aqueous liquid, wherein the aqueous liquid is the continuous phase of the grouting composition; and (iii) an insulating material; and (B) allowing the grouting composition to set after the step of introducing, wherein after setting the grouting composition has a thermal conductivity of less than 0.3 BTU/hr·ft·° F.

According to another embodiment, a grouting composition for use in insulating a portion of a tubular located inside an enclosed conduit comprises: (A) a water-swellable binding material comprising a water-swellable clay; (B) an aqueous liquid, wherein the aqueous liquid is the continuous phase of the grouting composition; and (C) an insulating material, wherein after the grouting composition has set, the grouting composition has a thermal conductivity of less than 0.3 BTU/hr·ft·° F.

DETAILED DESCRIPTION OF THE INVENTION

As used herein, the words "comprise," "have," "include," and all grammatical variations thereof are each intended to have an open, non-limiting meaning that does not exclude additional elements or steps.

As used herein, a "fluid" is a substance having a continuous phase and that tends to flow and to conform to the outline of its container when the substance is tested at a temperature of 71° F. and a pressure of 1 atmosphere. An example of a fluid is a liquid or gas. A heterogeneous fluid has an external phase and at least one internal phase. By contrast, a homogenous fluid does not have distinct phases. Examples of a heterogeneous fluid include a slurry, which is a suspension of solid particles in a continuous liquid phase; an emulsion, which is a suspension of two or more immiscible liquids where droplets of at least one liquid phase are dispersed in a continuous liquid phase of another; and a foam, which is a suspension or dispersion of gas bubbles in a continuous liquid phase. As used herein, the term "water-based" means a heterogeneous fluid in which the continuous liquid phase is an aqueous liquid.

As used herein, the verb "grout" and all grammatical variations means filling a void with a substance that sets. As used herein, a "grouting composition" is a mixture of at least a binding material and a liquid (and possibly other additives) that is used to grout. As used herein, the term "binding material" means a dry powder substance that acts as a binder to bind other materials together.

As used herein, a "well" includes at least one wellbore drilled into a subterranean formation, which may be a reservoir or an aquifer, or adjacent to a reservoir or aquifer. A wellbore can have vertical and horizontal portions, and it can be straight, curved, or branched. As used herein, the term "wellbore" refers to a wellbore itself, including any uncased, open-hole portion of the wellbore. A near-wellbore region is the subterranean material and rock of the subterranean formation surrounding the wellbore. As used herein, a "well" also includes the near-wellbore region. The near-wellbore region is considered to be the region within about 100 feet of the wellbore. As used herein, "into a well" means and includes into any portion of the well, including into the wellbore or into the near-wellbore region via the wellbore.

Oil and gas hydrocarbons, as well as water, are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). A subterranean formation that contains water is referred to as an aquifer.

In order to produce hydrocarbons or water, a wellbore is drilled into or near a reservoir or aquifer. A well that is drilled into a reservoir is generally called an oil or gas well; whereas a well that is drilled into an aquifer is generally called a water well. The wellbore may be an open hole or cased hole. In an open-hole wellbore, a tubular called a tubing string is placed into the wellbore. The tubing string allows fluids to be introduced into or flowed from a remote portion of the wellbore. In a cased hole, another tubular called a casing is placed into the wellbore that can contain a tubing string. As used herein, the word "tubular" means any kind of pipe. Examples of tubulars include, but are not limited to, a tubing string, a casing, a drill pipe, a line pipe, and a transportation pipe. Tubulars can also be used to transport fluids into or out of a subterranean formation, such as oil, gas, water, liquefied methane, coolants, and heated fluids. For example, a tubular can be placed underground to transport produced hydrocarbons or water from a subterranean formation to another location.

As used herein, the term "annulus" means the space between two generally cylindrical objects, one inside the other, where fluid can flow. The objects can be concentric or eccentric. One of the objects can be a tubular and the other object can be an enclosed conduit. The enclosed conduit can be a wellbore or borehole or it can be another tubular. The following examples illustrate some situations in which an annulus can exist, but are in no way limiting as to all the situations in which an annulus can exist. Referring to an oil, gas, or water well, in an open hole well, the space between the wellbore and the outside of a tubing string is an annulus. In a cased hole, the space between the wellbore and the outside of the casing is an annulus. Also, in a cased hole, there may be an annulus between the tubing string and the inside of the casing. Referring to transportation pipelines, an annulus can exist between the outside of the tubular and the borehole underground in which the tubular is placed. In an off shore environment, a transportation tubular can be located inside another tubular. The space between the outside of the transportation tubular and the inside of the other tubular is an annulus.

It is common to introduce a grouting composition into an annulus. For example, in a cased hole, the grouting composition can be placed and allowed to set in the annulus between the wellbore and the casing in order to create a seal in the annulus. By sealing the casing in the wellbore, fluids are prevented from flowing into the annulus. Consequently, hydrocarbons or water can be produced in a controlled manner by directing the flow of hydrocarbons or water through the casing and into the wellhead. By way of another example, a grouting composition can be placed in the annulus between a casing and a tubing string. Grouting compositions can also be used as an isolating fluid to isolate one portion of an annulus from another portion of the annulus.

During grouting operations, it is necessary for the grouting composition to remain pumpable during introduction into the annulus and until the composition is situated in the annulus. After the grouting composition has reached the portion of the annulus to be grouted, the grouting composition ultimately sets. A grouting composition that thickens too quickly while being pumped can damage pumping equipment or block tubulars and a grouting composition that sets too slowly can cost time and money while waiting for the composition to set.

If any test (e.g., thickening time or shear strength) requires the step of mixing, then the grouting composition is "mixed" according to the following procedure. Any of the ingredients that are a dry substance and a dispersant (if a dispersant is included in the grouting composition) are pre-blended. The aqueous liquid is added to a mixing container and the container is then placed on a mixer base. For example, the mixer can be a LIGHTNING™ mixer. The motor of the base is then turned on and maintained at about 1,000 revolutions per minute (rpm). The pre-blended ingredients are then added to the container at a uniform rate in not more than 5 minutes (min). After all the pre-blended ingredients have been added to the aqueous liquid in the container, a cover is then placed on the container, and the grouting composition is mixed at about 1,000 rpm (+/−50 rpm) for 5 min. It is to be understood that the grouting composition is mixed at ambient temperature and pressure (about 71° F. and about 1 atmosphere of pressure). It is also to be understood that if any test (e.g., thickening time and shear strength) specifies the test be performed at a specified temperature and possibly a specified pressure, then the temperature and pressure of the grouting composition is ramped up to the specified temperature and pressure after being mixed at ambient temperature and pressure. For example, the grouting composition can be mixed at 71° F. and then placed into the testing apparatus and the temperature of the grouting composition can be ramped up to the specified temperature. As used herein, the rate of ramping up the temperature is in the range of about 3° F./min to about 5° F./min. After the grouting composition is ramped up to the specified temperature and possibly pressure, the grouting composition is maintained at that temperature and pressure for the duration of the testing.

As used herein, the "thickening time" is how long it takes for a grouting composition to become unpumpable at a specified temperature and specified pressure. The pumpability of a grouting composition is related to the consistency of the composition. The consistency of a grouting composition is measured in Bearden units of consistency (Bc), a dimensionless unit with no direct conversion factor to the more common units of viscosity. As used herein, a grouting composition becomes "unpumpable" when the consistency of the composition reaches 60 Bc. As used herein, the consistency of a grouting composition is measured as follows. The grouting composition is mixed. The grouting composition is then placed in the test cell of an atmospheric consistometer, such as a Model 165AT atmospheric consistometer available from Fann Instrument Company in Houston, Tex. The grouting composition is ramped up to the specified temperature and pressure and is maintained at the specified temperature and pressure. Consistency measurements are taken continuously until the grouting composition exceeds 60 Bc.

A grouting composition can set. The shear strength of a grouting composition can be used to indicate whether the grouting composition has set. It is desirable to have a high shear strength for a grouting composition. Shear strength is the strength of a material or component against the type of yield or structural failure where the material or component shears and can be expressed in units of lb/100 ft$^2$. Shear strength is generally measured at a specified time after the grouting composition has been mixed and the composition is tested at a specified temperature and possibly a specified pressure. For example, shear strength can be measured at a time in the range of about 48 to about 72 hours after the composition is mixed and the composition is tested at a temperature of 71° F. and a pressure of 1 atmosphere. As used herein, the shear strength of a grouting composition is measured as follows in accordance with API RP 13B-1, Appendix B. The grouting composition is mixed and given 24 to 48 hours to develop shear strength. Next, a metal shear tube 3.5 inches (89 mm) in length, with an outside diameter of 1.4 inches (36 mm), and wall thickness of 0.008 inches (0.02 mm) is placed onto the surface of the grouting composition. A platform or "stage" is then placed directly on top of the metal shear tube. Incremental amounts of a known weight are sequentially placed on the platform until the metal shear tube is submerged approximately 2 inches into the surface of the grouting composition. The depth submerged is then accurately measured and recorded along with the combined weight of the platform and the incrementally added weights. When inches, grams, gallons, and pounds are the units employed, the following equation can be utilized to calculate shear strength:

$$S = \frac{3.61(Z+W)}{L\,6} - 0.256A$$

where S=shear strength in lb/100 ft$^2$, Z=weight of shear tube in grams, W=total shear weight in grams (platform+incrementally added weights), L=submerged depth of shear tube in inches, and A is the grouting composition density in lb/gal. As used herein, a grouting composition is considered "set" if the composition has a shear strength of at least 200 lb/100 ft$^2$ when measured at 48 hours at a temperature of 71° F. and a pressure of 1 atmosphere.

Tubulars can be made of copper, iron, aluminum, various grades of steel, various plastics such as PVC and HDPE, cement composites, and concrete. Metals are generally thermally conductive. Thermal conductivity refers to the ability of a material to conduct heat. The thermal conductivity for a material, such as a metal, can be calculated as follows:

$$k=(\Delta Q/A\Delta t)*(x/\Delta T)$$

where $\Delta Q$=quantity of heat; $\Delta t$=time; x=thickness of the material; A=surface area of the material; and $\Delta T$=temperature difference. Thermal conductivity can be expressed in English units of BTU/hr·ft·° F. Some metals conduct more heat compared to other metals. For example, the thermal conductivity of copper is 229 BTU/hr·ft·° F., whereas, the thermal conductivity of iron is 46 BTU/hr·ft·° F.

As used herein, the thermal conductivity of a grouting composition is measured by utilizing a variation of the heat line source test method using a KD2 Pro meter from Decagon Devices with a needle probe having a large length to diameter ratio. The probe consists of a heating element and a temperature measuring element and is inserted into the specimen. A known current and voltage are applied to the probe and the temperature rise with time is recorded over a period of time. The thermal conductivity of a grouting composition is measured as follows. The grouting composition is mixed. The grouting composition is allowed to set at a temperature of 71° F. and a pressure of 1 atm. The probe of the KD2 Pro is then completely submerged into the surface of the material and allowed to equilibrate for 15 minutes. The device is set to measure thermal conductivity in BTU/hr·ft·° F. Data is deemed acceptable for $r^2$ correlations of 0.9990 or greater.

Heat flows from an area of higher temperature to an adjacent area of lower temperature. For example, if the temperature of a surrounding enclosed conduit is higher than the temperature of a fluid located in a tubular, then the temperature of the fluid can be increased via the tubular transferring heat from the enclosed conduit to the fluid. By way of another example, if the temperature of an enclosed conduit is lower than the temperature of a fluid located in a tubular, then the temperature of the fluid can be decreased via the tubular transferring heat from the fluid to the enclosed conduit. The greater the thermal conductivity of a material, the more heat can be transferred through the material from an area of higher temperature to an area of lower temperature. An insulating material should have a much lower thermal conductivity compared to the surrounding formation or compared to a grouting composition with a thermal conductivity of greater than 0.3 BTU/hr·ft·° F. Therefore, it is often desirable to insulate a tubular in order to inhibit the tubular from transferring heat to or from the fluid.

Foams have been used to insulate a portion of a tubular located in an enclosed conduit. However, foams can be dangerous to work with due to the great expansive properties of the foam. Foams can also require specialized equipment to store the foam components and pump the foam into an annulus. Foams can also be affixed to a tubular before the tubular is placed in an enclosed conduit. However, this approach is costly, time-consuming, and it is often difficult to place the pre-insulated tubular in the enclosed conduit. Also, due to the curing times of foams, there is a limit to the length of tubular that can be insulated in a given amount of time. Therefore, there is a need for an insulating composition that is not a foam to be used for insulating a portion of a tubular located in an enclosed conduit.

It has been discovered that a water-based grouting composition with an insulating material can be used to insulate at least a portion of a tubular that is located in an enclosed conduit.

According to an embodiment, a method for thermally insulating a portion of a tubular located inside an enclosed conduit comprises the steps of: (A) introducing a grouting composition into an annulus between the tubular and the enclosed conduit, the grouting composition comprising: (i) a water-swellable binding material comprising a water-swellable clay; (ii) an aqueous liquid, wherein the aqueous liquid is the continuous phase of the grouting composition; and (iii) an insulating material; and (B) allowing the grouting composition to set after the step of introducing, wherein after setting the grouting composition has a thermal conductivity of less than 0.3 BTU/hr·ft·° F.

According to another embodiment, a grouting composition for use in insulating a portion of a tubular located inside an enclosed conduit comprises: (A) a water-swellable binding material comprising a water-swellable clay; (B) an aqueous liquid, wherein the aqueous liquid is the continuous phase of the grouting composition; and (C) an insulating material, wherein after the grouting composition has set, the grouting composition has a thermal conductivity of less than 0.3 BTU/hr·ft·° F.

The discussion of preferred embodiments regarding the grouting composition, or any ingredient in the grouting composition, is intended to apply to the methods of the invention and the compositions of the invention. Any reference to the unit "gallons" means U.S. gallons.

The grouting composition includes a water-swellable binding material comprising a water-swellable clay. As used herein, the term "water-swellable" means that the binding material is able to incorporate an aqueous liquid into the microstructure of the binding material. Preferably, the binding material is water insoluble. As used herein, the term "water insoluble" means that less than 1 part of the binding material dissolves in 1000 parts of the aqueous liquid. Preferably, the binding material is a clay. The clay can be selected from the group consisting of bentonite, hectorite, attapulgite, and sepiolite, in any combination thereof. Commercially available examples of a binding material include, but are not limited to BAROTHERM® GOLD, QUIK GEL®, NATIONAL® STANDARD, NATIONAL® PREMIUM, QUIK GROUT®, available from Halliburton in Houston, Tex. Most preferably, the binding material is a bentonite clay, which is believed to be best for situations where hydraulic conductivities of less than or equal to about $1 \times 10^{-7}$ cm/sec is required. An example of such a situation may be encountered in a water well. Preferably, the binding material is in a concentration of at least 75 pounds per 100 gallons of the aqueous liquid. The binding material can be in a concentration in the range of about 75 to about 500 pounds per 100 gallons of the aqueous liquid. More preferably, the binding material is in a concentration in the range of about 150 to about 400 pounds per 100 gallons of the aqueous liquid.

The grouting composition can include a beneficiation additive. A beneficiation additive can increase the water-swelling capability of the binding material. By increasing the water-swelling capability of the binding material, the binding material is able to incorporate more of the aqueous liquid into the binding material's microstructure compared to a grouting composition without a beneficiation additive. The addition of a beneficiation additive can help ensure the grouting composition sets. The beneficiation additive should be selected such that it will increase the water-swelling capability of the specific binding material used. The beneficiation additive can be an alkali salt. In one embodiment, the beneficiation additive is a sodium salt, such as sodium carbonate, sodium sulfate, sodium hydroxide, and sodium chloride.

In another embodiment, the beneficiation additive is soda ash. Preferably, the beneficiation additive is in at least a sufficient concentration such the grouting composition develops a sufficient viscosity to suspend any undissolved solids in the grouting composition after the grouting composition is mixed and during the step of introducing. The beneficiation additive is preferably in at least a sufficient concentration such that the grouting composition sets in less than 48 hours at a temperature of 71° F. and a pressure of 1 atm. Preferably, the beneficiation additive is in a concentration of at least 0.5 lb/100 gallons of the aqueous liquid. More preferably, the beneficiation additive is in a concentration in the range of about 0.5 to about 10 lb/100 gal of the aqueous liquid. Most preferably, the beneficiation additive is in a concentration in the range of about 2 to about 4 lb/100 gal of the aqueous liquid.

The grouting composition includes an aqueous liquid, wherein the aqueous liquid is the continuous phase of the grouting composition. Preferably, the aqueous liquid is selected from the group consisting of freshwater, brackish water, seawater, brine, and any combination thereof. Bentonite clays can be sensitive to the quality of water. Therefore, the type of aqueous liquid selected can be tested prior to the step of introducing to ensure the aqueous liquid will be compatible with the specific ingredients in the grouting composition. Most preferably, the aqueous liquid is freshwater.

Preferably, the grouting composition is a slurry in which the aqueous liquid is the continuous liquid phase and includes undissolved solids. The grouting composition can also be an emulsion in which the aqueous liquid is the continuous liquid phase. There can be undissolved solids in the continuous phase of the emulsion. The grouting composition can further include a surfactant. Also, if the grouting composition is an emulsion, then a hydrocarbon liquid is the dispersed phase. For an emulsion, the hydrocarbon liquid is preferably in a concentration of less than 10% by volume of the aqueous liquid continuous phase. Preferably, the grouting composition is not a foam.

The grouting composition includes an insulating material. As used herein, the term "insulating material" means a material that has a thermal conductivity of less than 0.2 BTU/hr·ft·° F. As used herein, the term "insulating material" also means a water-insoluble material. Insolubility can be defined as have a solubility of less than $1 \times 10^{-5}$ g per liter. The insulating material can be selected from the group consisting of a hollow microsphere, a solid microsphere, vermiculite, rubber, polymer particles, and any combination thereof. The hollow microsphere can be made from a mixture of fly ash and crystalline silica or a mixture of soda lime borosilicate glass and silica gel. More than one type of hollow microsphere can be used. The solid microsphere can be made from a polymer. A commercially-available example of the hollow microsphere mixture of fly ash and crystalline silica is SPHERELITE® additive, available from Halliburton in Duncan, Okla. Commercially-available examples of the hollow microsphere mixture of soda lime borosilicate glass and silica gel include HGS2000™, HGS3000™, HGS4000™, HGS5000™, HGS6000™, HGS10000™, and HGS18000™ glass bubbles, available from 3M in St. Paul, Minn., in any combination thereof. A commercially-available example of a solid microsphere made from a polymer is LUBRA-BEADS® FINE, available from Halliburton in Houston, Tex. Other polymer microspheres and particles can be selected from any of a number of common polymers such as polyethylene, polypropylene polyvinyl chloride, polytetrafluoroethylene, polystyrene. A commercially-available example of the rubber is crumb rubber, available from Grauband Macon, LLC in Macon, Mo. Preferably, the insulating material has a particle size distribution such that at least 90% of the insulating material has a particle size of less than 10 mesh. More preferably, the insulating material has a particle size distribution such that at least 90% of the insulating material has a particle size in the range of about 10 to about 325 mesh.

Preferably, the insulating material is in at least a sufficient concentration such that the grouting composition has a thermal conductivity of less than 0.3 BTU/hr·ft·° F. More preferably, the insulating material is in at least a sufficient concentration such that the grouting composition has a thermal conductivity of less than 0.2 BTU/hr·ft·° F. Preferably, the insulating material is in a concentration of at least 50 pounds per 100 gallons of the aqueous liquid. More preferably, the insulating material is in a concentration in the range of about 50 to about 600 pounds per 100 gallons of the aqueous liquid. Most preferably, the insulating material is in a concentration in the range of about 300 to about 500 pounds per 100 gallons of the aqueous liquid.

A dispersant, also called a thinner or deflocculant, can be included in the grouting composition. The dispersant can help increase the thickening time of the grouting composition. Without being limited by theory, it is believed that the dispersant helps increase the thickening time by reducing the viscosity of the grouting composition. The dispersant can be selected from the group consisting of derivatives of an acid, phosphates, alkylated carbonates and silicates, lignite compounds, and low molecular weight polymers, in any combination thereof. The derivatives of an acid can be selected from the group consisting of derivatives of tannic acid, dericatives of citric acid, derivatives of humic acid, and derivatives of phosphoric acid, in any combination thereof. The derivatives of an acid can be selected from the group consisting of citrate, quebracho, sulfomethylated quebracho, alkylated quebracho and other organic derivatives of the same, disodium hydrogen phosphate, trisodium phosphate, and dihydrogen phosphate, in any combination thereof. The phosphates can be selected from the group consisting of tetrasodium polyphosphate, sodium tripolyphosphate, sodium hexametaphosphate, sodium acid pyrophosphate sodium metaphosphate, and sodium esametaphosphate, in any combination thereof. The lignite compounds can be selected from the group consisting of lignosulfonates, causticized lignite, causticized leonardite, zirconium lignosulfonates, titanium lignosulfonates, ferro lignosulfonates, chrome lignosulfonates, and ferro-chrome lignosulfonates, in any combination thereof. Transition metal citrate complexes such as zirconium and titanium lignosulfonates can also be employed. Examples of suitable low molecular-weight polymers include, but are not limited to: polyacrylates; alkaline salts of polyacrylic acid; poly(sulfonated styrene-co-maleic anhydride); poly(acrylic acid-co-vinyl sulfonic acid); alkaline salts of polymethacrylate; polyacrylamide 2-acrylamido-2-methylpropane sulfonic acid; sodium salts of polyacrylamide 2-acrylamido-2-methylpropane sulfonic acid; polymers produced from condensed naphthalene sulfonic acid sulfonated polymers; polymers of unsaturated dicarboxylic acids and monoethylenically unsaturated monocarboxylic acids; graft polymer of ethylenically unsaturated monomers and polyalkylene glycols; polymers and polymeric alkylated salts of allyloxybenzenesulfonates; and terpolymers and graft copolymers of tetrahydrophthalic acid, acrylic acid and 2-acrylamido-2-methylpropane sulfonic acid and lignosulfonates. Also known to the art are polymeric organosilicon based thinners. As used herein, the term "low molecular weight polymer" means a polymer with a molecular weight of less than 10,000. Commercially-available examples of suitable dispersants include CFR®2 dispersant, CFR®3 dispersant, CFR®5LE dispersant, CFR®6 dispersant, CFR®8 dispersant, THERMA-FLOW 500™ dispersant, BARAFOS® dispersant, BARATHIN-PLUS® thinner, ENVIRO-THIN™ thinner, LIGNOX® dispersant, QUIK-THIN® thinner, THERMA-THIN® thinner, AQUA-CLEAR® PFD dispersant, INVERMUL® NT emulsifier, EZ MUL® emulsifier, COLDTROL® thinner, ATC® thinner, and FACTANT® emulsifier, available from Halliburton in Duncan, Okla. and Houston, Tex.

Preferably, the dispersant is in at least a sufficient concentration such that the grouting composition has a thickening time of at least 5 minutes at a temperature of 90° F. and a pressure of 1 atm, whereas an otherwise identical grouting composition without the dispersant would have a thickening time of less than 5 minutes at the same temperature and pressure. Preferably, the dispersant is in a concentration equal to or less than a sufficient concentration such that the viscosity of the grouting composition is high enough to suspend any undissolved solids in the grouting composition. Preferably, the dispersant is in a concentration equal to or less than a sufficient concentration such that the grouting composition sets in less than 48 hours at a temperature of 71° F. and a pressure of 1 atm. Preferably, the dispersant is in a concentration of at least 0.5 lb/100 gallons of the aqueous liquid. More preferably, the dispersant is in a concentration in the range of about 2 to about 10 pounds per 100 gallons of the aqueous liquid. Most preferably, the dispersant is in a concentration in the range of about 5 to about 8 pounds per 100 gallons of the aqueous liquid.

Preferably, the grouting composition has a thickening time of at least 10 minutes at a temperature of 80° F. and a pressure of 1 atmosphere (atm). It is preferred that the grouting composition has a thickening time of at least 5 minutes at a temperature of 90° F. and a pressure of 1 atm. More preferably, the grouting composition has a thickening time in the range of about 5 to about 20 minutes at a temperature of 90° F. and a pressure of 1 atm. Without being limited by theory, it is believed that the thickening time of the grouting composition decreases with an increase in the total amount of undissolved solids contained in the grouting composition. Thus, one way that the thickening time of the grouting composition can be increased is to decrease the total amount of undissolved solids in the grouting composition.

Preferably, the grouting composition has a shear strength of at least 200 lb/100 ft$^2$ when tested at 24 hours at a temperature of 71° F. and a pressure of 1 atm. More preferably, the grouting composition has a shear strength in the range of about 500 to about 40,000 lb/100 ft$^2$ when tested at 24 hours at a temperature of 71° F. and a pressure of 1 atm. Most preferably, the grouting composition has a shear strength in the range of about 500 to about 2,000 lb/100 ft$^2$ when tested at 24 hours at a temperature of 71° F. and a pressure of 1 atm.

After setting, the grouting composition has a thermal conductivity of less than 0.3 BTU/hr·ft·° F. Preferably, the grouting composition has a thermal conductivity of less than 0.2 BTU/hr·ft·° F.

Preferably, the grouting composition has a density of at least 5 pounds per gallon (ppg). More preferably, the grouting composition has a density in the range of about 5 to about 10 ppg. Most preferably, the grouting composition has a density in the range of about 7 to about 9 ppg.

The grouting composition can include at least one additive suitable for use in subterranean grouting operations. Examples of such additives include, but are not limited to, cement, a high-density additive, a filler, a strength-retrogression additive, a set accelerator, a set retarder, a mechanical property enhancing additive, a lost-circulation material, a filtration-control additive, a fluid loss control additive, a defoaming agent, a thixotropic additive, a nano-particle, and any combination thereof.

The grouting composition can include cement. As used herein, the term "cement" means a dry powder substance that acts to bind materials together upon mixing with water and becomes hard or solid by curing after mixing with the water. Preferably, the cement is Class A cement, Class C cement, Class G cement, or Class H cement. Preferably, the cement is in a concentration in the range of about 50 pounds to about 200 pounds per 100 gallons of the aqueous liquid.

The grouting composition can include a high-density additive. In many applications, the composition preferably includes a high-density additive. Preferably, the high-density additive is selected from the group consisting of barite, calcium carbonate, various iron oxides, and any combination thereof. A commercially-available example of barite is BAROID™, available from Halliburton Energy Services, Inc. in Duncan, Okla. Preferably, the high-density additive is in a concentration in the range of about 100 to about 400 pounds per 100 gallons of the aqueous liquid.

The grouting composition can include a filler material. An example of a filler material includes, but is not limited to, diatomaceous earth. Preferably, the filler material is in a concentration in the range of about 50 to about 200 pounds per 100 gallons of the aqueous liquid. A filler material can also increase the shear strength of a grouting composition.

Preferably, the grouting composition does not include any biodegradeable polymeric material. Such biopolymers are highly suseptable to biodegradation and are not suitable in satiations where the NSF/ANSI Standard 60 for drinking water is required.

The method includes the step of introducing the grouting composition into an annulus between the tubular and the enclosed conduit. The annulus can be located under land or off shore. The annulus can be part of a transportation pipeline or part of a well. Preferably, the annulus is located at a depth of less than 1,000 feet under land or the sea floor. If the annulus is located in a well, then the well can be an oil, gas, water, or injection well. The step of introducing can be for any purpose where insulating a tubular would be beneficial.

The grouting composition is in a pumpable state upon introduction into the annulus. The method includes the step of allowing or causing the grouting composition to set after the step of introducing.

The method can further include the step of mixing the grouting composition prior to the step of introducing. It is to be understood that the step of mixing the grouting composition prior to the step of introducing is not the same as the step of mixing a grouting composition for testing purposes (e.g., for testing thickening time or shear strength). One of skill in the art will be able to select the best mixing method based on, inter alia, the specific equipment available at the site of introduction. Preferably, the step of mixing is performed in less than 10 minutes prior to the step of introducing. The binding material and the insulating material can be pre-blended prior to mixing with the aqueous liquid. If a beneficiation additive is included in the grouting composition, then the beneficiation additive can be added to the binding material and the insulating material prior to mixing the binding material, insulating material, and beneficiation additive with the aqueous liquid. If a dispersant is included in the grouting composition, then the dispersant can be added: to the binding material and the insulating material prior to mixing the binding material, insulating material, and dispersant with the aqueous liquid; to the binding material, the insulating material, and the optional beneficiation additive prior to being mixed with the aqueous liquid; or to the grouting composition after the binding material, insulating material, and optional beneficiation additive are mixed with the aqueous liquid.

In addition to the effect the total amount of undissolved solids can have on the thickening time, the thickening time of the grouting composition can be inversely proportional to temperature. Testing can be performed for a specific grouting composition at temperature to determine the thickening time. The test results can then be compared to the specific temperature of the application for the sufficiency of the thickening time at the application temperature.

Preferably, the grouting composition has a thickening time of at least 10 minutes at the temperature and pressure of the annulus. More preferably, the grouting composition has a thickening time in the range of about 10 to about 100 minutes at the temperature and pressure of the annulus. Preferably, the grouting composition sets in less than 48 hours after the step of introducing at the temperature and pressure of the annulus. More preferably, the grouting composition sets in less than 24 hours after the step of introducing at the temperature and pressure of the annulus. Most preferably, the grouting composition sets at a time in the range of about 1 to about 24 hours after the step of introducing at the temperature and pressure of the annulus. The grouting composition can be introduced into a high-temperature annulus (i.e., an annulus having a temperature in the range of about 100° F. to about 350° F.). The grouting composition can be introduced into a low-temperature annulus (i.e., an annulus having a temperature in the range of about 25° F. to about 100° F.).

EXAMPLES

To facilitate a better understanding of the present invention, the following examples of certain embodiments are given. The following examples are not the only examples that could be given according to the present invention and are not intended to limit the scope of the invention.

Table 1 lists the ingredients, concentration of the ingredients in pounds per 100 gallons of the base fluid, thickening time, shear strength, and thermal conductivity for various grouting compositions.

The examples include a "Control" formulation, a "High Solids" formulation, and a "Low Solids" formulation. Each of the example compositions was formulated with deionized water. The compositions include a binding material of bentonite clay, sodium salts, different amounts of a low molecular weight polymer as the dispersant. The "Control" does not include any insulating material.

TABLE 1

| COMPOSITION | "Control" | "High Solids" | "Low Solids" | "High Solids" |
|---|---|---|---|---|
| Test Temperature | 90 F. | 90 F. | 90 F. | 100 F. |
| Density lb/gal | 9.95 | 7.32 | 7.44 | 7.32 |
| lb dispersant/100 gal H2O | 3.068 | 7.146 | 6.598 | 7.146 |
| lb sodium salts/100 gal H2O | 6.136 | 3.478 | 3.478 | 3.478 |
| lb clay/100 gal H2O | 298 | 169 | 169 | 169 |
| lb Spherelite ™/100 gal H2O | 0 | 286 | 257 | 286 |
| lb HGS4000/100 gal H2O | 0 | 143 | 129 | 143 |
| lb solids/100 gal H2O | 307 | 608 | 565 | 608 |
| thickening time, min | 60+ | 60 | 112 | 31.5 |
| shear strength (lb/100 ft$^2$) | 160 | 590 | 420 | 590 |
| Thermal Conductivity, BTU/ft · hr · ° F. | 0.400 | 0.203 | 0.227 | 0.203 |

As can be seen from the examples of Table 1, the inclusion of the insulating materials improves the shear strength and thermal conductivity relative to the "Control" under the test conditions.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more of the element that it introduces. If there is any conflict in the usages of a word or term in this specification and one or more patent(s) or other documents that may be incorporated herein by reference, the definitions that are consistent with this specification should be adopted.

What is claimed is:

1. A method for thermally insulating a portion of a tubular located inside an enclosed conduit, the method comprising the steps of:
   (A) introducing a grouting composition into an annulus between the tubular and the enclosed conduit, the grouting composition comprising:
      (i) a water-swellable binding material comprising a water-swellable clay;
      (ii) an aqueous liquid, wherein the aqueous liquid is the continuous phase of the grouting composition; and
      (iii) an insulating material having a thermal conductivity of less than 0.2 BTU/hr·ft·° F. and a water solubility of less than 1×10$^{-5}$ g per liter; and
   (B) allowing the grouting composition to set after the step of introducing, wherein the grouting compositions has a shear strength of at least 200 lb/100 ft$^2$ when tested at 24 hours at a temperature of 71° F. and a pressure of 1 atmosphere, and wherein after setting the grouting composition has a thermal conductivity of less than 0.3 BTU/hr·ft·° F.

2. The method according to claim 1, wherein the binding material is in a concentration of at least 75 pounds per 100 gallons of the aqueous liquid.

3. The method according to claim 1, wherein the binding material is in a concentration in the range of about 200 to about 400 pounds per 100 gallons of the aqueous liquid.

4. The method according to claim 1, wherein the aqueous liquid is selected from the group consisting of freshwater, brackish water, seawater, brine, and any combination thereof.

5. The method according to claim 1, wherein the insulating material is selected from the group consisting of: a hollow microsphere; vermiculite; rubber; polymer particles; and any combination thereof.

6. The method according to claim 5, wherein the hollow microsphere is made from a mixture of fly ash and crystalline silica, a mixture of soda lime borosilicate glass and silica gel, or a polymer.

7. The method according to claim 6, wherein the insulating material has a particle size distribution such that at least 90% of the insulating material has a particle size of less than 10 mesh.

8. The method according to claim 1, wherein the insulating material is in at least a concentration such that after setting the grouting composition has a thermal conductivity of less than 0.2 BTU/hr·ft·° F.

9. The method according to claim 1, wherein the insulating material is in a concentration of at least 20 pounds per 100 gallons of aqueous liquid.

10. The method according to claim 1, wherein the insulating material is in a concentration in the range of about 100 to about 500 pounds per 100 gallons of aqueous liquid.

11. The method according to claim 1, wherein the grouting composition has a thickening time of at least 10 minutes at a temperature of 80° F. and a pressure of 1 atmosphere.

12. The method according to claim 1, wherein after setting the grouting composition has a thermal conductivity of less than 0.2 BTU/hr·ft·° F.

13. The method according to claim 1, wherein the grouting composition has a density in the range of about 5 to about 10 pounds per gallon.

14. The method according to claim 1, wherein the grouting composition further comprises at least one additive.

15. The method according to claim 14, wherein the at least one additive is selected from the group consisting of: cement, barite, calcium carbonate, various iron oxides, a dispersant, a filler, a strength-retrogression additive, a set accelerator, a set retarder, a mechanical property enhancing additive, a lost-circulation material, a filtration-control additive, a fluid loss control additive, a defoaming agent, a thixotropic additive, and a nano-particle.

16. The method according to claim 1, wherein the method further includes the step of mixing the grouting composition prior to the step of introducing.

17. The method according to claim 1, wherein the grouting composition has a thickening time of at least 10 minutes at the temperature and pressure of the annulus.

18. The method according to claim 1, wherein the grouting composition sets in less than 48 hours after the step of introducing at the temperature and pressure of the annulus.

19. The method according to claim 1, wherein the insulating material is selected from the group consisting of: vermiculite; rubber; polymer particles; and any combination thereof.

* * * * *